United States Patent Office 3,483,223
Patented Dec. 9, 1969

3,483,223
SYNTHESIS OF A-NORANDROSTANE STEROIDS
Seymour D. Levine, North Brunswick, and Patrick A. Diassi, Westfield, N.J., assignors to E. R. Squibb & Sons, Inc., New York, N.Y., a corporation of Delaware
No Drawing. Continuation-in-part of applications Ser. No. 383,243, July 16, 1964, and Ser. No. 407,515, Oct. 29, 1964. This application Oct. 26, 1966, Ser. No. 589,497
Int. Cl. C07d *101/00;* C07c *171/06;* A61k *27/00*
U.S. Cl. 260—343.3                            16 Claims

ABSTRACT OF THE DISCLOSURE

Disclosed herein are A-norandrostane compounds of the formula

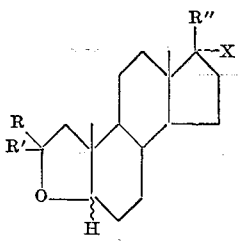

wherein each R and R' is hydrogen and together R and R' is oxo (O=); R" is selected from the group consisting of hydroxy and acyloxy, wherein the acyl radical is of a straight chain saturated hydrocarbon carboxylic acid of up to 12 carbon atoms; X is selected from the group consisting of hydrogen, lower alkyl, lower alkenyl and lower alkynyl; and together X and R" is oxo, H being α-bonded when R and R' is oxo. These compounds have utility as anti-androgenic agents.

---

This application is a continuation-in-part of copending application Ser. No. 383,243, filed July 16, 1964, now abandoned, and Ser. No. 407,515, filed Oct. 29, 1964 now abandoned, in the names of Seymour D. Levine and Patrick A. Diassi.

This invention relates to and has as its object the provision of novel physioligically active steroids, methods for their production and novel intermediates useful in said preparation. More particularly, this invention relates to the production of steroids of the formula

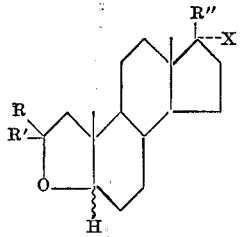

wherein each R and R' are hydrogen and together R and R' is oxo (O=); X is selected from the group consisting of hydrogen, lower alkyl, lower alkenyl and lower alkynyl; and R" is selected from the group consisting of hydroxy and acyloxy and together X and R" is oxo, H being α-bonded when R and R' is oxo.

The acyl radicals preferred in the operation of this invention are those of hydrocarbon carboxylic acids of up to twelve carbon atoms as exemplified by the alkanoic acids (e.g., lower alkanoic acids such as acetic, propionic, butyric, and tert-pentanoic acid as well as such acids as octanoic acid and dodecanoic acid), the alkenoic acids, the alkynoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

Particularly preferred compounds of this invention comprise those wherein X is hydrogen, lower alkyl, vinyl or ethynyl.

[In this application and in the appended claims, whenever in the formulae set forth herein a curved line (∫) is employed in the linkage of atoms, it is meant to denote that the connected atom may be either in the alpha or beta position, as is determined in the respective compounds involved.]

The final products of this invention are physiologically active steroids and possess anti-androgenic activity, i.e., they inhibit the action of androgens. The final products of this invention may be used in the treatment of such conditions as hyperandrogenic acne and they may be formulated for such administration, the concentration and/or dosage being based on the activity of the particular compound and the requirements of the patient.

The compounds of the instant invention may be prepared by the processes of this invention beginning with A-nortestosterone as starting material. The processes of this invention may be represented by the following equations, wherein the Ac represents acyl and X is as hereinabove defined.

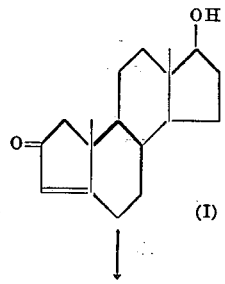

(I)

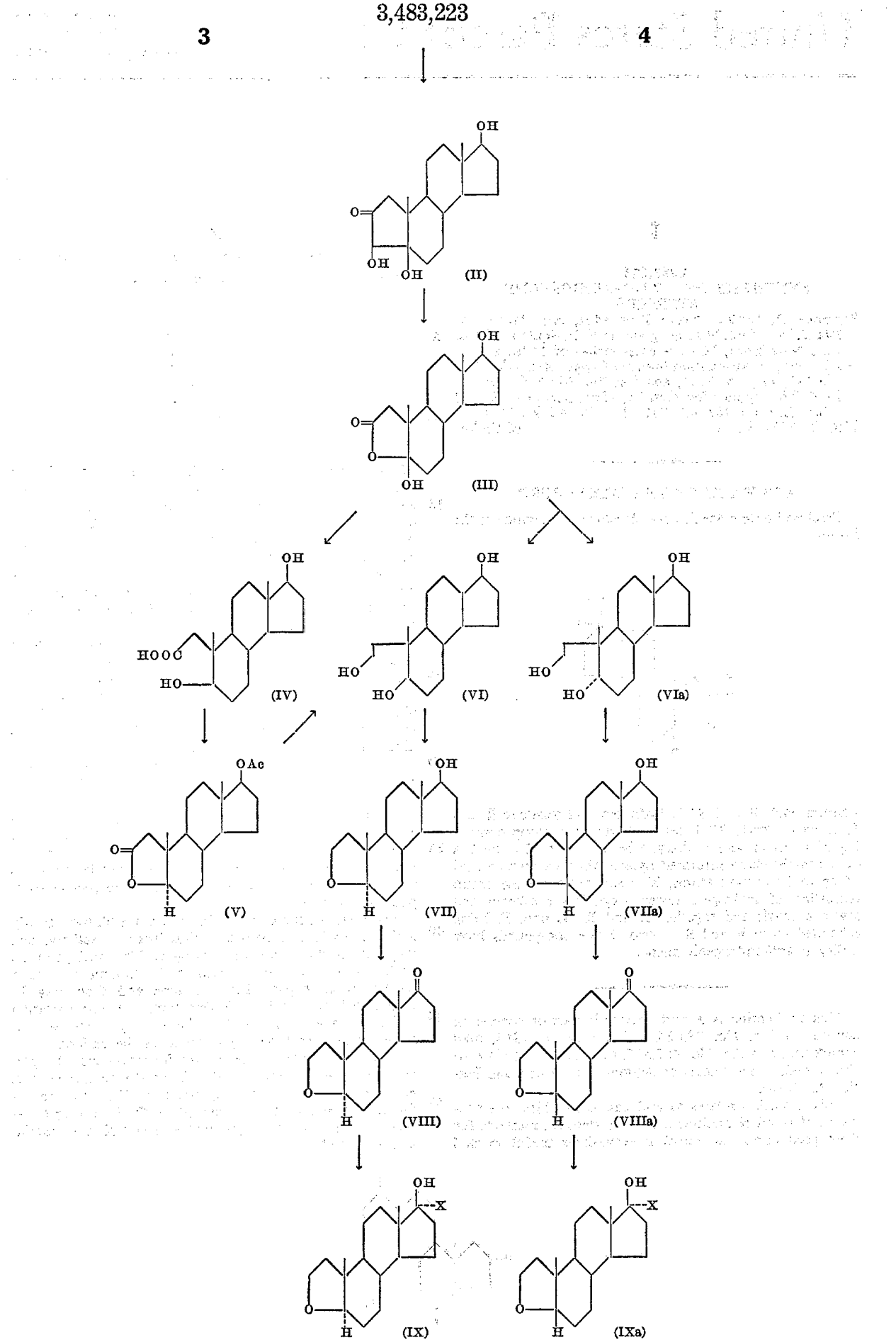

In the first step of the processes of this invention, A-nortestosterone is oxidized, as by treatment with osmium tetroxide to yield the A-nor-2-one-3β,5β,17β-triol derivative (Compound II). Compound (II) may also be prepared according to the procedures set forth in copending application, Ser. No. 359,417, filed Apr. 13, 1964 now U.S. Patent No. 3,324,171, in the names of Seymour D. Levine and Patrick A. Diassi.

Compound (II) may then be further oxidized as by treatment with periodic acid to yield the 3-oxa-5β-hydroxy - A - nor - 2 - one derivative (Compound III). Compound (III) may also be prepared according to the teachings of Weisenborn et al. in 76 JACS 552 (1954).

Compound (III) may then be treated with an alkali borohydride, for example, sodium borohydride to yield 2,5-secobisnorandrostane diol acid derivative (Compound IV).

Compound (IV) may then be treated with an alkali metal acylate, for example, sodium acetate, and an acylating agent, for example, an acyl anhydride such as acetic anhydride, or an acyl halide, such as acetyl chloride, to yield the 3-oxa-5α-A-nor-2-one derivative (Compound V).

Compound (V) may then be treated with a reducing agent, for example, lithium aluminum hydride to yield the 2,5 - seco - 3,4 - bisnorandrostane - 2,5β,17β - triol derivative (Compound VI).

Alternatively, Compound (III) may be treated directly with a reducing agent such as lithium aluminum hydride to produce a mixture of the 2,5-seco-3,4-bisnorandrostane - 2,5β,17β - triol (Compound VI) and the 2,5-seco-3,4-bisnorandrostane-2,5α,17β-triol (Compound VIa), which compounds, if desired, may easily be acylated to the corresponding triacetate derivatives.

Compound (VI) may be reacted, as with toluenesulfonyl chloride in pyridene to yield the 3-oxa-5α-A-norandrostane derivative (Compound VII).

Compound (VIa) may be selectively converted to the 3-oxa-5β-A-norandrostane derivative (Compound VIIa) by treatment of the above mixture with perchloric acid in acetone.

Compounds (VII) and (VIIa) may then be treated with chromium trioxide in acetone to produce the corresponding 5α- and 5β-17-keto deratives (Compounds VIII and VIIIa).

Compounds (VIII) and (VIIIa) may be converted to the corresponding 5α- and 5β-17α-alkyl-17β-hydroxy derivatives (Compounds IX and IXa) by treatment with a Grignard reagent of the formula R—Mg (halo), wherein R is lower alkyl.

Alternatively, treatment of the 17-keto derivatives (VIII) and (VIIIa) with, for instance, lithium acetylide-ethylenediamine complex may be carried out to produce 17α-ethynyl-17β-hydroxy derivatives corresponding to Formulas IX and IXa, which may be acylated as with acetic anhydride in the presence of perchloric acid to form the corresponding 17α-ethynyl-17β-acetate derivatives.

Catalytic hydrogenation of either the 17α-ethynyl-17β-hydroxy or the 17α-ethynyl-17β-acetate compounds may be performed to produce after the uptake of one mole equivalent of hydrogen the corresponding 17α-vinyl compounds corresponding to Formulas IX and IXa. Likewise, complete saturation of the side chain by hydrogenation produces the corresponding 17α-ethyl compounds.

In order to prepare the desired acyl derivatives of the instant invention, the respective primary or secondary hydroxy compounds may be treated with an acylating agent, such as an acidic anhydride or an acyl halide, in the presence of an organic base, such as pyridine.

The invention may be illustrated by the following examples:

EXAMPLE 1

A-norandrostane-2-one-3β,5β,17β-triol

A mixture of 3.25 g. of A-nortestrosterone and 3.0 g. of osmium tetroxide in 3 ml. of pyridine and 60 ml. of benzene is stirred at room temperature for forty-eight hours. The reaction mixture is diluted with 100 ml. of dioxane and treated with hydrogen sulfide for five minutes. The precipitate is filtered and the filtrate is evaporated to dryness and crystallized from ethyl acetate to give A-norandrostane-2-one-3β,5β,17β-triol

EXAMPLE 2

3-oxa-A-norandrostane-5β,17β-diol-2-one

A solution of 3.9 g. of periodic acid in 10 ml. of water is added to a solution of 1.93 g. of A-norandrostane-2-one-3α,5α,17β-triol in 10 ml. of pyridine and 80 ml. of methanol and the reaction mixture is left at room temperature for sixteen and one-half hours. The reaction mixture is evaporated to near dryness, and the residue diluted with water and extracted three times with chloroform. The chloroform extracts are extracted three times with a saturated sodium bicarbonate solution. The aqueous phase is acidified and extracted four times with ethyl acetate. The ethyl acetate extracts are washed with 8% salt solution, dried over sodium sulfate, and evaporated to dryness. Crystallization of the residue from ether-ethyl acetate gives 1.14 g. of 3-oxa-A-norandrostane -5β,17β-diol-2-one having a melting point of 183–184°.

EXAMPLE 3

2,5-seco-3,4-bisnor-androstane-5β,17β-diol-2-oic acid

A solution of 60 mg. of 3-oxa-A-norandrostane-5α,17β-diol-2-one in 5 ml. of ethanol is stirred overnight with a solution of 45 mg. of sodium borohydride in 1 ml. of water. The reaction mixture is poured into water, acidified, and extracted three times with ether. The ether extracts are washed with an 8% salt solution, dried over sodium sulfate, and evaporated to dryness. Crystallization of the residue from methanol-ether gives 24 mg. of 2,5 - seco - 3,4 - bisnorandrostane - 5β,17β-diol - 2 - oic acid having a melting point of 200–202°. Recrystallization from methanol-isopropyl ether gives the analytical sample having melting point 203–204° $[\alpha]_D^{22}+32°$ (EtOH);

$\lambda_{max}^{KBr}$ 3.03, 5.80, and 5.97μ

*Analysis.*—Calc'd. for $C_{17}H_{28}O_4$ (296.39): C, 68.89; H, 9.52. Found: C, 68.81; H, 9.54.

EXAMPLE 4

3-oxa-5α-A-norandrostane-2-one-17β-ol acetate

A mixture of 400 mg. of 2,5-seco-3,4-bisnor-androstane-5β,17β-diol-2-oic acid and 100 mg. of sodium acetate in 5 ml. of acetic anhydride is refluxed for four hours. The reaction mixture is poured into ice-water and extracted three times with ethyl acetate. The ethyl acetate extracts are washed with an 8% salt solution, dried over sodium sulfate, and evaporated to dryness. Crystallization of the residue from isopropyl ether gives 305 mg. of 3-oxa-5α-A-norandrostane-2-one-17β-ol acetate having a melting point of 166–168°. Recrystallization from isopropyl ether gives the analytical sample having melting point 168–169°; $[\alpha]_D^{31}+64°$ (EtOH);

$\lambda_{max}^{KBr}$ 5.65, and 5.80μ

*Analysis.*—Calc'd. for $C_{19}H_{28}O_4$ (320.41): C, 71.22; H, 8.81. Found: C, 71.41; H, 8.86.

EXAMPLE 5

2,5-seco-3,4-bisnorandrostane-2,5β,17β-triol

A solution of 300 mg. of 3-oxa-5α-A-norandrostane-2-one-17β-ol acetate in 20 ml. of ether is added at room temperature to a stirred suspension of 300 mg. of lithium aluminum hydride in 75 ml. of ether over a period of ten minutes. The reaction mixture is refluxed for twenty-four hours, then treated with water-saturated ether and dilute hydrochloric acid. The ether layer is separated and the aqueous phase extracted four times with chloroform and four times with ethyl acetate. The combined organic extracts are washed with 8% salt solution, dried over sodium sulfate, and evaporated to dryness to give 135 mg. of 2,5 - seco - 3,4 - bisnorandrostane - 2,5β,17β-triol having a melting point of 250–253°. Recrystallization from methanol-isopropyl ether gives the analytical sample having melting point 253–254°; $[\alpha]_D^{26}+20°$ (EtOH);

$$\lambda_{max}^{KBr} \ 3.10\mu$$

Analysis.—Calc'd. for $C_{17}H_{30}O_3$ (282.41): C, 72.30; H, 10.71. Found: C, 72.42; H, 10.57.

EXAMPLE 6

3-oxa-5α-A-norandrostane-17β-ol acetate (a) A mixture of 105 mg. of 2,5-seco-3,4-bisnorandrostane-2,5β,17β-triol and 140 mg. of p-toluenesulfonyl chloride in 7 ml. of pyridine is left at room temperature for sixteen hours, then warmed on a steam bath for three hours. The reaction mixture is poured into ice-water and extracted three times with chloroform. The chloroform extracts are washed with a 2N-hydrochloride acid solution, a saturated sodium bicarbonate solution, 8% salt solution, dried over sodium sulfate and evaporated to dryness. Plate chromatography of the residue using neutral alumina (Activity V) as the adsorbent and chloroform as the developing solvent gives a major band at about Rf 0.5, which is detectable by iodine vapor. Elution with ethyl acetate gives 71 mg. of 3-oxa-5α-A-norandrostane-17β-ol.

(b) The 3-oxa-5α-A-norandrostane-17β-ol is acetylated by refluxing in 1 ml. of acetic anhydride and 0.1 ml. of pyridine for forty-five minutes. The reaction mixture is poured into ice-water and extracted three times with ether. The extracts are washed with a saturated sodium bicarbonate solution, 8% salt solution, dried over sodium sulfate, and evaporated to dryness. The residue is chromatographed as described above using hexane containing 10% chloroform as the developing solvent. Elution with ethyl acetate and crystallization from petroleum ether gives 33 mg. of 3-oxa-5α-A-norandrostane-17β-ol acetate having a melting point of 118–119°. Recrystallization from petroleum ether gives the analytical sample having melting point 118.5–119.5°; $[\alpha]_D^{27}+15°$ (ETOH);

$$\lambda_{max}^{KBr} \ 5.77\mu$$

τSi(CH$_3$)$_4$ 9.19 (s., 19-Me), 9.18 (s., 18-Me), 7.97 (s., 17-acetate), 6.95 (d., 4 cps., 11.7 cps., 5-H), 5.39 (m., 17-H).

Analysis.—Calc'd for $C_{19}H_{30}O_3$ (306.43); C: 74.47; H: 9.87. Found: C: 74.46; H: 9.73.

EXAMPLE 7

3-oxa-5α-A-norandrostane-17-one

A solution of 200 mg. of 3-oxa-5α-A-norandrostane-17β-ol in 6 ml. of acetone is treated dropwise with stirring with an excess of chromium trioxide-sulfuric acid. The reaction mixture is stirred for four minutes and then two drops of ethanol are added. The acetone is decanted and the inorganic residue washed with additional acetone. Evaporation of the combined acetone fractions gives 3-oxa-5α-A-norandrostane-17-one.

EXAMPLE 8

17α-methyl-3-oxa-5α-A-norandrostane-17β-ol

A solution of 100 mg. of 3-oxa-5α-A-norandrostane-17 one in 15 ml. of ether is added over a five-minute period to a threefold excess of methyl magnesium bromide in ether. The reaction mixture is refluxed for two hours, treated with dilute hydrochloric acid and water, and the layers separated. The ether layer is washed with 8% salt solution and dried over sodium sulfate. Evaporation gives 17α-methyl-3-oxa-5α-A-norandrostane-17β-ol.

Similarly, following the above procedure, but substituting equivalent amounts of other alkyl magnesium bromide reagents, for example, ethyl magnesium bromide, propyl magnesium bromide, or hexyl magnesium bromide for the methyl magnesium bromide, there is obtained the respective 17α-alkyl substituted compound, i.e., 17α-ethyl-3-oxa-5α-A-norandrostane-17β-ol, 17α-propyl-3-oxa-5α-A-norandrostane-17β-ol, and 17α-hexyl-3-oxa-5α-A-norandrostane-17β-ol.

EXAMPLE 9

2,5-seco-3,4-bisnorandrostane-2,5β,17β-triol-2,5,17-triacetate

Following the procedure set forth in Example 6b but substituting equivalent amounts of 2,5-seco-3,4-bisnorandrostane - 2,5β,17β-triol, for 3 - oxa - 5α - A - androstane-17β-ol, there is obtained 2,5-seco-3,4-bisnorandrostane-2,5β,17β-triol-2,5,17-triacetate.

EXAMPLE 10

3-oxa-5α-A-norandrostane-17β-ol octanoate

Following the procedure of Example 6b but substituting an equivalent amount of octanoic anhydride for the acetic anhydride, there is obtained 3-oxa-5α-A-norandrostane-17β-ol octanoate.

EXAMPLE 11

17α-methyl-3-oxa-5α-A-norandrostane-17β-ol dodecanoate

Following the procedure of Example 6b but substituting equivalent amounts of 17α-methyl-3-oxa-5α-A-norandrostane-17β-ol for the 3-oxa-5α-A-norandrostane-17β-ol and dodecanoic anhydride for the acetic anhydride, there is obtained 17α-methyl-3-oxa-5α-A-norandrostane-17β-ol dodecanoate.

EXAMPLE 12

2,5-seco-3,4-bisnorandrostane-2,5β,17β-triol; 2,5-seco-3,4-bisnorandrostane-2,5α,17β-triol A mixture of 500 mg. of 3-oxa-A-norandrostane-5β,17β-diol-2-one and 750 mg. of lithium aluminum hydride in 25 ml. of tetrahydrofuran is refluxed for one day. The reaction mixture is treated with water and 2N hydrochloric acid and the organic solvents evaporated. The aqueous phase is filtered and the precipitate heated in methanol. The methanol solution is filtered and evaporated to dryness. The residue is crystallized from methanol-isopropyl ether to give 2,5-seco-3,4-bisnorandrostane-2,5β,17β-triol. The mother liquor is a mixture of the 5α- and 5β-ols.

EXAMPLE 13

3-oxa-5β-A-norandrostane-17β-ol

The mother liquor from Example 12 is stirred for four hours at room temperature in 5 ml. of acetone containing 0.1 ml. of 70% perchloric acid. The reaction mixture is evaporated and the residue taken up in chloroform. The chloroform solution is washed with 8% salt solution, dried over sodium sulfate and evaporated. Plate chromatography of the residue on neutral alumina (Activity V) using chloroform-hexane (2:1) as the developing solvent gives a major band detectable with iodine. Elution with ethyl acetate and evaporation to dryness gives 3-oxa-5β-A-norandrostane-17β-ol.

EXAMPLE 14

3-oxa-5β-A-norandrostane-17β-ol acetate

Room temperature acetylation of 3-oxa-5β-A-norandrostane-17β-ol with acetic anhydride in pyridine gives 3-oxa-5β-A-norandrostane-17β-ol acetate.

EXAMPLE 15

3-oxa-5β-A-norandrostane-17-one

Following the procedure in Example 7, but substituting 3-oxa-5β-A-norandrostane-17β-ol for 3-oxa-5α-A-norandrostane17βol, there is obtained 3oxa-5β-A-norandrostane-17-one.

EXAMPLE 16

17α-ethynyl-3-oxa-5α-A-norandrostane-17β-ol

A mixture of 707 mg. of 3-oxa-5α-A-norandrostane-17- one and 1 g. of lithium acetylide-ethylenediamine complex in 25 ml. of benzene and 25 ml. of tetrahydrofuran is warmed at about 50° under nitrogen with stirring for 21 hours. Water (20 ml.) is added and the reaction mixture is refluxed for one hour, cooled and the organic layer separated. The aqueous phase is extracted with chloroform and the combined organic fractions are combined, washed with 8% salt solution, dried over sodium sulfate and evaporated. Plate chromatography of the residue on neutral alumina (Activity V) using chloroform as the developing solvent gives a major band detectable with iodine. Elution with ethyl acetate and crystallization from chloroform-isopropyl ether gives 255 mg. of 17α-ethynyl-3-oxa-5α-A-norandrostane-17β-ol, M.P. 192.5–194.5°. Recrystallization from chloroform-isopropyl ether gives the analytical sample; M.P. 203.5–205.5°; [α]$_D^{24}$ —42° (EtOH); λ$^{KBr}$ 2.99, 3.09 and 4.77μ.

$\tau_{CDCl_3}^{TMS}$ 9.15 (s., 18-Me, 19-Me)

7.45 (s, 17α-ethynyl), 6.95 (d,d, 4 cps., 11.5 cps., 5α-H) and 6.12 (d,d, 6 cps., 9 cps., 2-CH$_2$).

Analysis.—Calc'd. for C$_{19}$H$_{28}$O$_2$ (288.41): C, 79.12; H, 9.79. Found: C, 79.14; H, 9.82.

EXAMPLE 17

17α-vinyl-3-oxa-5α-A-norandrostane-17β-ol

A solution of 500 mg. of 17α-ethynyl-3-oxa-5α-A-norandrostane-17β-ol in 25 ml. of dioxane is hydrogenated in the presence of 50 mg. of 5% Pd/C catalyst until one mole-equivalent of hydrogen is consumed. The catalyst is removed by filtration and the filtrate evaporated to give 17α-vinyl-3-oxa-5α-A-norandrostane-17β-ol.

EXAMPLE 18

17α-ethyl-3-oxa-5α-A-norandrostane-17β-ol

A solution of 279 mg. of 17α-ethynyl-3-oxa-5α-A-norandrostane-17β-ol in 15 ml. of dioxane is hydrogenated in the presence of 50 mg. of 5% Pd/C catalyst until the uptake of hydrogen ceased. The catalyst is removed by filtration and the filtrate is evaporated. The residue is crystallized from chloroform-isopropyl ether to give 144 mg. of 17α-ethyl-3-oxa-5α-A-norandrostane-17β-ol, M.P. 161.5–163.5°. Recrystallization from ether gives the analytical sample; M.P. 165.5–167.5° [α]$_D^{28}$+3° (EtOH); λ$^{KBr}$ 2.92μ;

$\tau_{CDCl_3}^{TMS}$ 9.16 (s., 18-Me)

9.11 (s, 19-Me), 9.03 (s, 17α-CH$_2$CH$_3$), 6.94 (m, 5α-H) and 6.10 (d,d, 5.5 cps., 9 cps., 2-CH$_2$).

Analysis.—Calc'd. for C$_{19}$H$_{32}$O$_2$ (292.45): C, 78.03; H, 11.03. Found: C, 78.09; H, 10.86.

EXAMPLE 19

17α-ethynyl-3-oxa-5β-A-norandrostane-17β-ol

Following the procedure in Example 16, but substituting 3-oxa - 5β - A - norandrostane-17-one for 3-oxa-5α-A-norandrostane-17-one, there is obtained 17α-ethynyl-3-oxa-5β-A-norandrostane-17β-ol.

EXAMPLE 20

17α-vinyl-3-oxa-5β-A-norandrostane-17β-ol

Following the procedure in Example 17, but substituting 17α-ethynyl-3-oxa-5β-A-norandrostane-17β-ol for 17α-ethynyl - 3 - oxa-5α-A-norandrostane-17β-ol, there is obtained 17α-vinyl-3-oxa-5β-A-norandrostane-17β-ol.

EXAMPLE 21

17α-ethyl-3-oxa-5β-A-norandrostane-17β-ol

Following the procedure in Example 18, but substituting 17α-ethynyl-3-oxa-5β-A-norandrostane-17β-ol for 17α-ethynyl -3 - oxa-5α-A-norandrostane-17β-ol, there is obtained 17α-ethyl-3-oxa-5β-A-norandrostane-17β-ol.

What is claimed is:

1. A compound of the formula

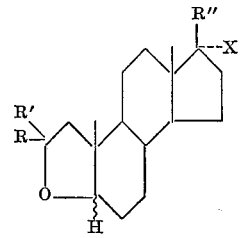

wherein each R and R' is hydrogen and together R and R' is oxo (O—); R" is selected from the group consisting of hydroxy and acyloxy, wherein the acyl radical is of a straight chain saturated hydrocarbon carboxylic acid of up to twelve carbon atoms; X is selected from the group consisting of hydrogen, lower alkyl, lower alkenyl and lower alkynyl; and together X and R" is oxo, H being α-bonded when R and R' is oxo.

2. A compound of claim 1 having the name 3-oxa-5α-A-norandrostane-17β-ol.

3. A compound of claim 1 having the name 3-oxa-5β-A-norandrostane-17β-ol.

4. A compound of claim 1 having the name 3-oxa-5α-A-norandrostane-17β-ol acetate.

5. A compound of claim 1 having the name 3-oxa-5β-A-norandrostane-17β-ol acetate.

6. A compound of claim 1 having the name 3-oxa-5α-A-norandrostane-17-one.

7. A compound of claim 1 having the name 3-oxa-5β-A-norandrostane-17-one.

8. A compound of claim 1 having the name 17α-methyl-3-oxa-5α-A-norandrostane-17β-ol.

9. A compound of claim 1 having the name 17α-ethyl-3-oxa-5α-A-norandrostane-17β-ol.

10. A compound of claim 1 having the name 17α-vinyl-3-oxa-5α-A-norandrostane-17β-ol.

11. A compound of claim 1 having the name 17α-ethynyl-3-oxa-5α-A-norandrostane-17β-ol.

12. A compound of claim 1 having the name 17α-methyl-3-oxa-5β-A-norandrostane-17β-ol.

13. A compound of claim 1 having the name 17α-ethyl-3-oxa-5β-A-norandrostane-17β-ol.

14. A compound of claim 1 having the name 17α-vinyl-3-oxa-5β-A-norandrostane-17β-ol.

15. A compound of claim 1 having the name 17α-ethynyl-3-oxa-5β-A-norandrostane-17β-ol.

16. 3-oxa-5α-A-norandrostane-2-one-17β-ol acetate.

References Cited

Pettit, G. R., Synthesis of Oxasteroids, May 18, 1961, pp. 4557–63.

ALEX MAZEL, Primary Examiner

ANNE MARIE T. TIGHE, Assistant Examiner

U.S. Cl. X.R.

260—346.2, 410, 468, 469, 483, 484, 514, 586, 617; 424—279, 285

PO-1050
(5/69)

UNITED STATES PATENT OFFICE
CERTIFICATE OF CORRECTION

Patent No. 3,483,223      Dated December 9, 1969

Inventor(s) Seymour D. Levine and Patrick A. Diassi

It is certified that error appears in the above-identified patent and that said Letters Patent are hereby corrected as shown below:

Column 5, line 36, "pyridene" should read --pyridine-- and in line 60, after "produce" insert -- , --; and in line 6 after "hydrogen" insert -- , --. Column 7, line 22, "hydrochloride" should read -- hydrochloric --. Column 8, line 70, "drostane17βol, there is obtained 3oxa" should read -- drostane-17β-ol, there is obtained 3-oxa --. Column 10, line 21, "(O-)" should read -- (O=) --.

SIGNED AND
SEALED

JUN 16 1970

(SEAL)
Attest:

Edward M. Fletcher, Jr.
Attesting Officer

WILLIAM E. SCHUYLER, J
Commissioner of Patent